United States Patent [19]

Sasaki

[11] Patent Number: 6,014,499

[45] Date of Patent: Jan. 11, 2000

[54] IMAGE FORMING APPARATUS WHICH FORMS AN IMAGE BY DOT IMAGES

[75] Inventor: Eiichi Sasaki, Sagamihara, Japan

[73] Assignee: Ricoh Company, Ltd., Tokyo, Japan

[21] Appl. No.: 08/801,111

[22] Filed: Feb. 14, 1997

[30] Foreign Application Priority Data

Feb. 14, 1996 [JP] Japan .................................. 8-027070
Jun. 28, 1996 [JP] Japan .................................. 8-169266

[51] Int. Cl.[7] ...................................................... H04N 1/46
[52] U.S. Cl. .......................................... 395/109; 358/519
[58] Field of Search .................................. 358/518–519, 358/534–536, 456–561; 395/109

[56] References Cited

U.S. PATENT DOCUMENTS 5,324,121  6/1994  Sasaki et al. ........................... 400/120

*Primary Examiner*—Thomas D. Lee
*Assistant Examiner*—Stephen Brinich
*Attorney, Agent, or Firm*—Oblon, Spivak, McClelland, Maier & Neustadt, P.C.

[57] ABSTRACT

An image forming apparatus which forms an image by dot images. The invention includes a halftoning device for processing of halftone for inputted image data, a judging device for judging characteristics in the neighborhood of a target dot output from the halftoning means, gamma correcting means for correcting the gamma characteristic of image data of the target dot according to the judging by the judging device. Therefore, it is possible to prevent image degradation and to decrease a number of levels of halftone of the printed image.

18 Claims, 13 Drawing Sheets

| h1 | h2 | v1 | v2 | d1 | d2 | d3 | d4 | GAMMA CORRECT-ING DATA |
|---|---|---|---|---|---|---|---|---|
| X | X | X | 1 | X | X | X | X | γa |
| X | X | 1 | X | X | X | X | X | |
| X | 1 | X | X | X | X | X | X | |
| 1 | X | X | X | X | X | X | X | |
| 0 | 0 | 0 | 0 | X | X | X | 1 | γb |
| 0 | 0 | 0 | 0 | X | X | 1 | X | |
| 0 | 0 | 0 | 0 | X | 1 | X | X | |
| 0 | 0 | 0 | 0 | 1 | 1 | X | X | |
| 0 | 0 | 0 | 0 | 0 | 0 | 0 | 0 | γc |

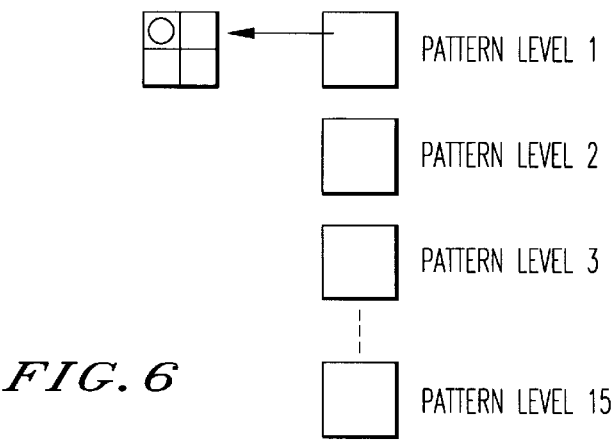
*FIG. 6*
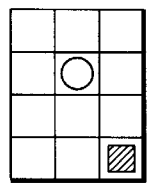 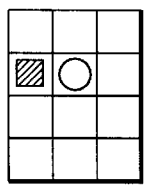 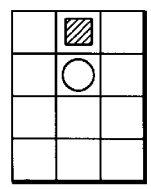
*FIG. 7A*　　*FIG. 7B*　　*FIG. 7C*
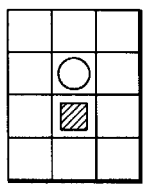 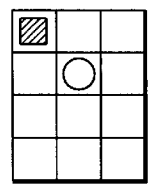 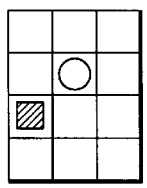
*FIG. 7D*　*FIG. 7E*　*FIG. 7F*
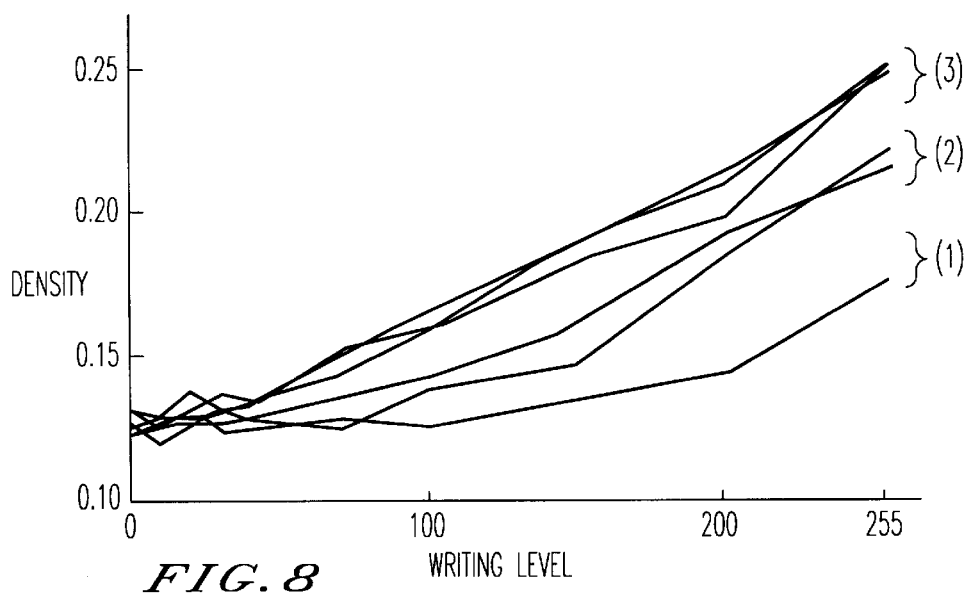
*FIG. 8*

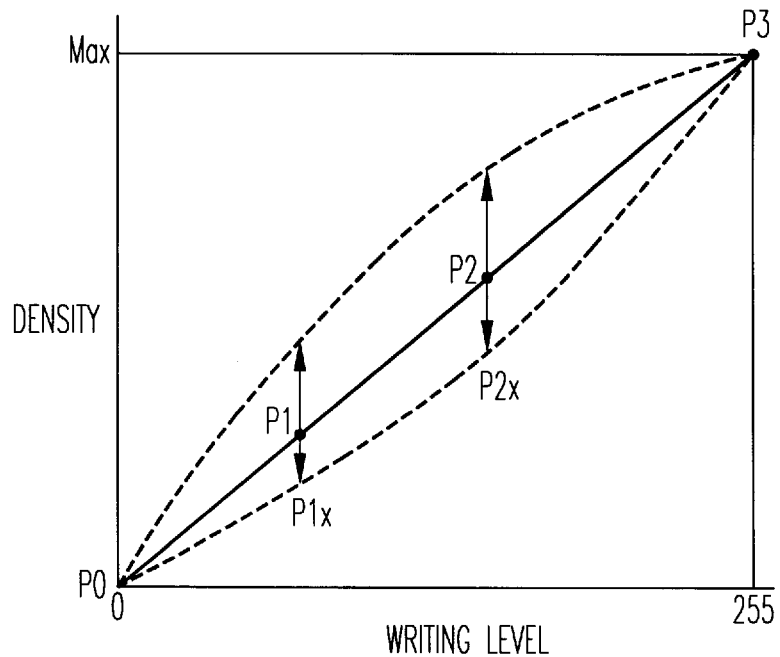
*FIG. 20*
| INPUTTED INFORMATION: | ROUND DOTS INFORMATION: |
|---|---|
| 0~12.5% | 0 |
| 12.5%~25% | 1 |
| 37.5%~50% | 2 |
| 50%~62.5% | 3 |
| ⋮ | ⋮ |
| 87.5%~100% | 7 |
*FIG. 21*
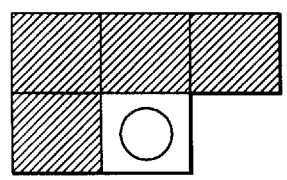
*FIG. 23*

IMAGE FORMING APPARATUS WHICH FORMS AN IMAGE BY DOT IMAGES

BACKGROUND OF THE INVENTION

1. Field of the Invention

This invention relates to an image forming apparatus such as a printer, a copier, a facsimile, or a multifunction apparatus which has some of these function, which forms an image using dot images.

2. Discussion of the Background

A known process for forming apparatus an image by dot images involves using a printer controller where the vector image data sent from an external apparatus, for example a host computer, is extended and stored as image memory data, or an original image data read by scanner and is stored as image memory data.

Then, these stored image data are read out by predetermined timing, and gamma correction is carried out for each dot. This gamma correction is carried out by changing writing density of dot or changing size of dot. By this gamma correction, the image data is corrected for a nonlinear characteristic of printer, and then, after halftoning process, for example a multilevel dithering process, the image data is sent to a printer engine.

In the printer engine, the image data from the printer controller is corrected for a variation of density, and printing out is executed according to corrected image data. In other words, a laser beam is modulated, power modulation or width modulation, according to the corrected image data, and dot images are formed on a recording paper by electrophotography.

However, in this process, an image forming apparatus is in the background, because the gamma correction is executed before the halftoning process, a number of levels of halftone of the printed image decreases. For example, when the number of levels of halftone of the image data which are read out from the image memory is 256 levels, the number of levels of halftone of a printed image is about 170 levels, so that the number of levels of halftone increases 2/3 times.

SUMMARY OF THE INVENTION

Accordingly, it is an object of the invention to provide an image forming apparatus which prevents image degradation and prevents a decrease in the number of levels of halftone of the printed image. The invention is an image forming apparatus which forms an image by dot images and includes, a halftoning device for processing of halftone for inputted image data, a judging device for judging characteristics in the neighborhood of a target dot outputted to the halftoning device, and gamma correcting structure for correcting gamma characteristic of image data of the target dot according to judging by the judging device.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 6 is a sample of gamma correction pattern of the image forming apparatus according to the embodiment;

FIG. 7 is a diagram of samples of dot pattern;

FIG. 8 is a graph of characteristics of gamma;

FIG. 20 is graph of a writing level-density;

FIG. 21 is inputted data;

FIG. 23 is another sample of gamma correction pattern of the image forming apparatus according to the embodiment.

DESCRIPTION OF THE PREFERRED EMBODIMENTS

Figure 2:
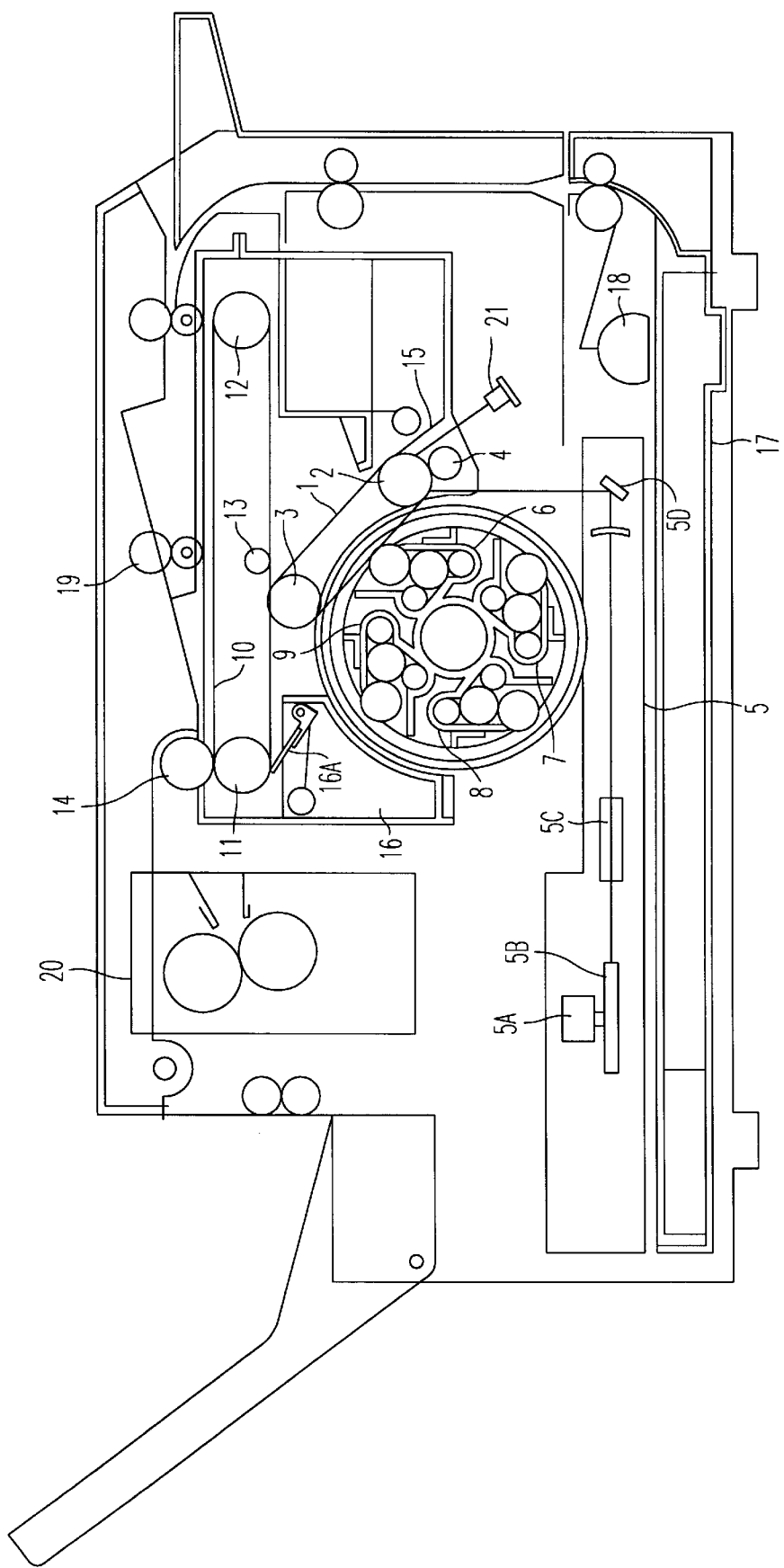
FIG. 2 is a diagram illustrating the construction of an image forming apparatus in the embodiment of the present invention.

Referring now to the drawings, wherein like reference numerals designate identical or corresponding parts throughout the several views. FIG. 2 shows an image forming apparatus according to the embodiment of present invention. In FIG. 2, a photoconductive belt 1 is supported by rotating rollers 2 and 3, and rotated clockwise by the rotating rollers 2 and 3.

A charging unit 4 and a cleaning unit 15 are placed proximal to the rotating roller 2. A laser writing unit 5 includes a laser diode, a motor 5A, a polygon mirror 5B, a lens unit 5C and a mirror 5D. Each developing unit 6–9 includes a developing sleeve and develops a latent image formed on the photoconductive belt 1 by each holding toner, for example yellow toner, magenta toner, cyan toner and black toner. Each developing is executed by a contacting or non-contacting developing process.

An intermediate image transfer belt 10 is supported by rotating roller 12 and 13, and rotated counterclockwise by a bias roller 3. The photoconductive belt 1 contacts the intermediate image transfer belt 10, and a developed toner image is transferred from photoconductive belt 1 to the intermediate image transfer belt 10 by the bias roller 3. The photoconductive belt 1 and intermediate image transfer belt 10 are seamless belts.

A transfer roller 14 is placed proximal to the intermediate image transfer belt 10 and controlled in such a way as to contact or separate from the intermediate image transfer belt 10. A cleaning unit 16 is cleaner for the intermediate image transfer belt 10 and a blade 16A in the cleaning unit 16 is controlled that during image formation, the blade 16A is separated from the intermediate image transfer belt 10, and after image formation, the blade 16A is contacted to the intermediate image transfer belt 10.

In this image forming apparatus, a image processing is executed as following. An bit map image data is made according to the data, for example read by a image scanner, then, after halftoning, the image data is stored in a image memory. The stored image data is read out and inputted to the laser writing unit. In the laser writing unit 5, a laser diode generate laser beam according to the inputted image data, then the laser beam is polarized by the polygon mirror 5B which is rotated by the motor 5A and led to the photoconductive belt 1 by way of the lens unit 5C and the mirror 5D. A latent image is formed on the photoconductive belt 1 which is charged by the charging unit 4.

The latent image is developed by each developing unit 6–9. Each developed image is overlaid on the intermediate image transfer belt 10. The overlaid image on the intermediate image transfer belt 10 is transferred to a recording paper which is fed from paper tray 17 by feed roller 18 and register roller 19. After transferring, the recording paper is fed to a fixing unit 20, and in the fixing unit 20, the toner image is fixed on the recording paper.

Figure 3:
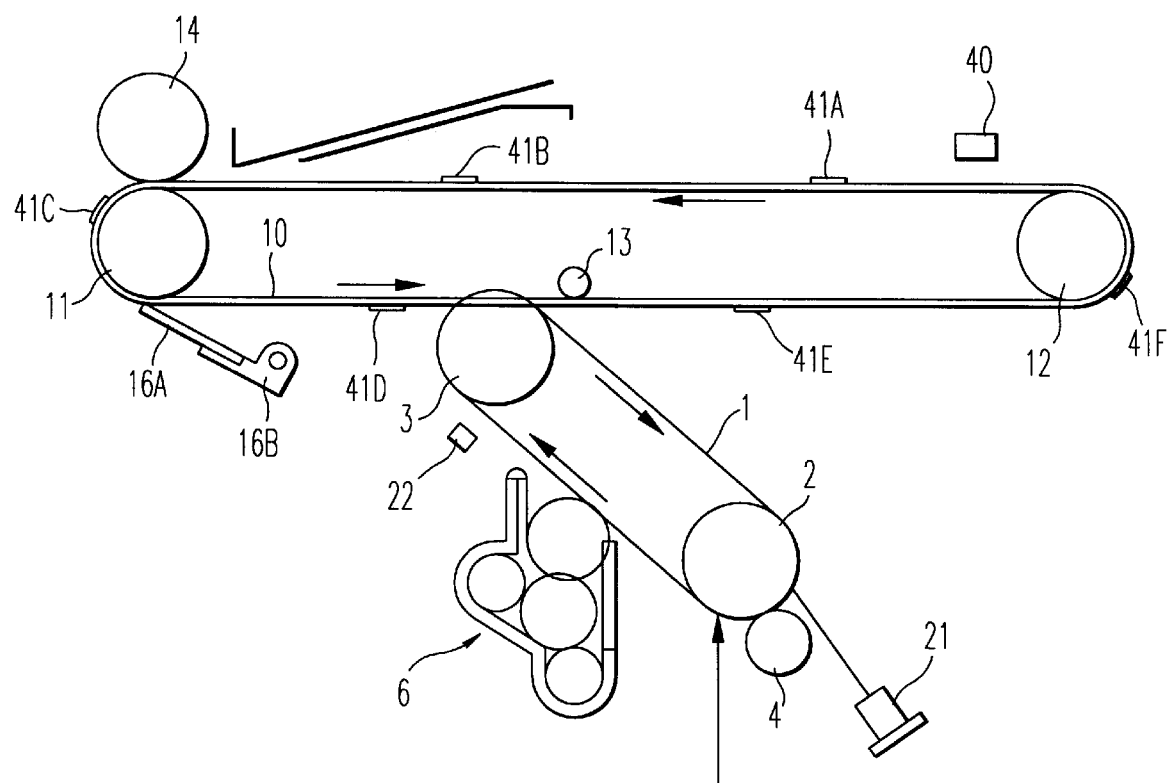
FIG. 3 is a enlarged view of the image forming apparatus of FIG. 2.

FIG. 3 is a enlarged view of the image forming apparatus of FIG. 2. Marks 41A–41F are placed on the intermediate image transfer belt 10. These marks are detected by a mark detecting unit 40. When an arbitrary mark, for example the mark 41A, is detected, a writing of first color image starts, then, when the mark 41A is detected again, a writing of second color image starts. A optical sensor 22 detects a toner density on the photoconductive belt 1. It is also possible that the optical sensor can be placed to detect a toner density on the intermediate image transfer belt 10.

Figures 1, 5:
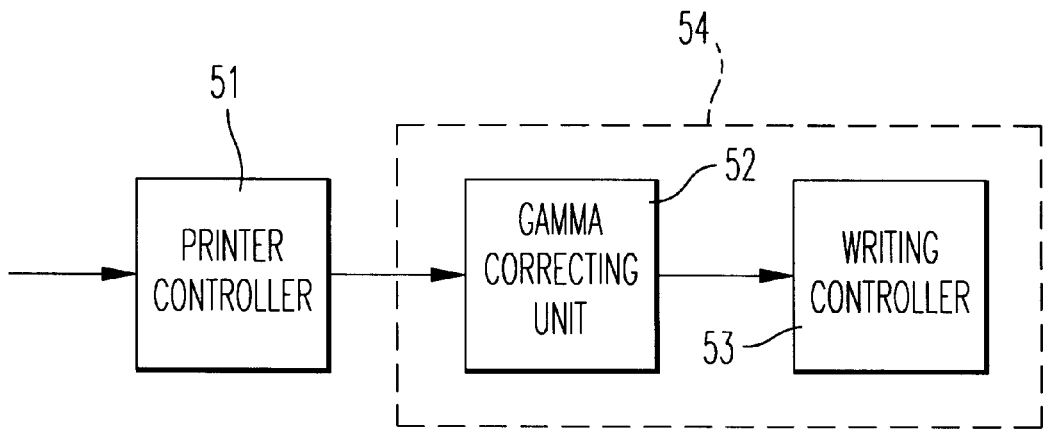
FIG. 1 is a block diagram of the image forming apparatus according to the embodiment.
FIG. 5 is a diagram of relationship data of a neighborhood dot determining latch in the characteristics judging unit and selected gamma correction data in the gamma correction circuit.

FIG. 1 is a block diagram of the image forming apparatus according to a first embodiment. The vector image data sent from an external apparatus, for example a host computer, is inputted to a printer controller 51. This printer controller is controlled by a CPU. In the printer controller, a bit map image data is made according to the inputted image data. In this bit map image data, one dot data includes data for four colors, yellow, magenta, cyan and black, with each color data being 8 bit data.

Then, in the printer controller 51, a halftoning processing, for example multilevel dithering of dot concentration, is executed for the bit map image data, and the bit map image data, with each color data being 8 bit data, is converted to bit map image data with each color data being 4 bit data. The converted bit map image data is stored as image memory data, and read out and inputted to a gamma correction unit 52 in printer engine 54.

The gamma correction unit 52 corrects characteristic of the inputted bit map image data according to data characteristics in the vicinity of a dot, and corrected data is sent to a writing controller 53 as a writing signal. The writing controller 53 modulates the laser beam which is generated by the laser diode in the laser writing unit 5 according to the writing signal, and the laser beam makes a latent image on the photoconductive belt 1.

Figure 4:
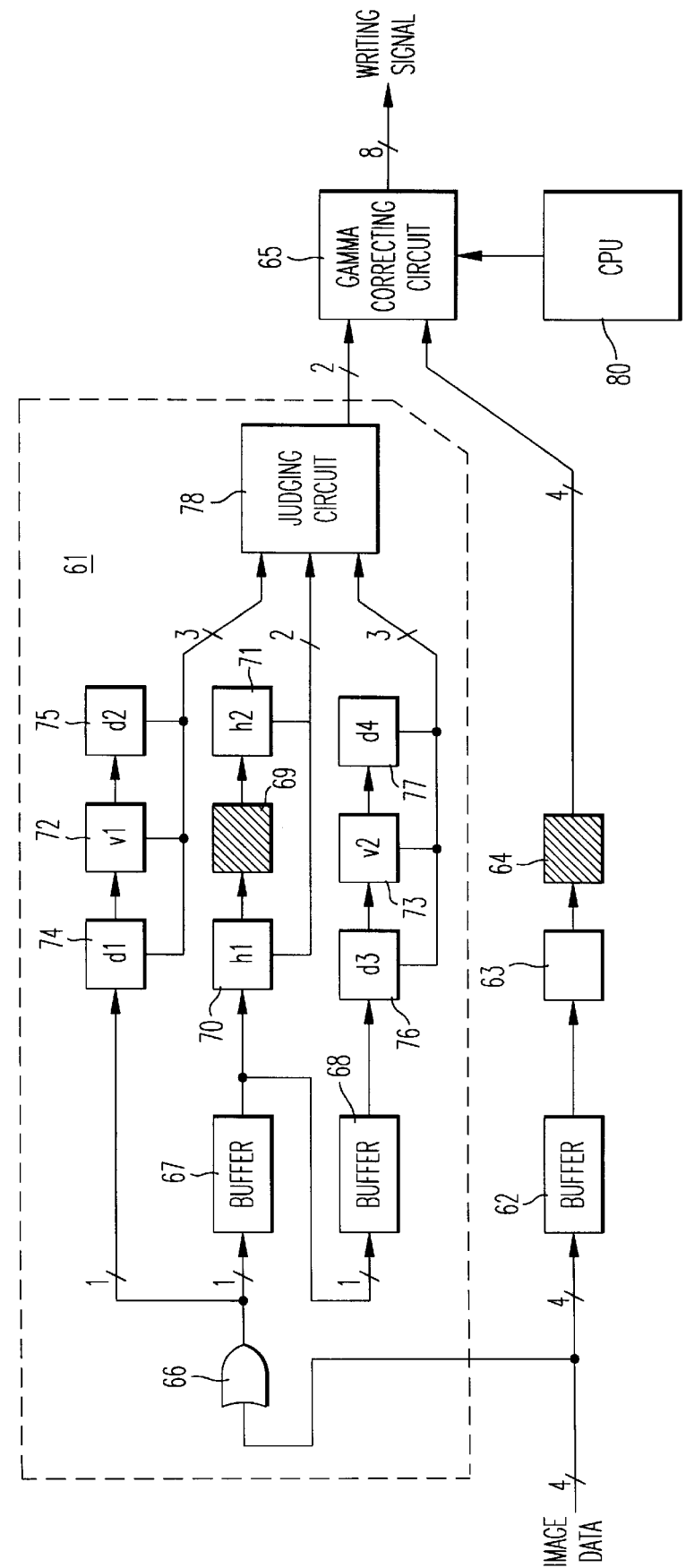
FIG. 4 is a block diagram of the gamma correcting unit of the image forming apparatus according to the embodiment.

FIG. 4 is a block diagram of the gamma correcting unit 52 of the image forming apparatus according to the embodiment. The gamma correcting unit 52 shown in FIG. 4 is for the image data which is made by multilevel dithering of dot concentrating, and includes a characteristic judging unit 61, a line buffer 62, a adjustment latch 63, a target dot latch 64 and a gamma correcting circuit 65. The characteristic judging unit 61 includes an OR gate circuit, a line buffer 67 and 68, a target dot latch 69, dot neighborhood determining latches 70–77 and judging circuit 78, 4 bit image data inputted from the printer controller 52 is sent to the OR gate circuit 66 for every color, yellow, magenta, cyan and black, and the OR gate circuit 66 converts the inputted 4 bit image data to one bit data which indicates a presence or absence of writing data in inputted 4 bit data. In other words, when all of inputted 4 bit data are "0", the OR gate circuit outputs "O" as writing data is absent, when at least one of inputted 4 bit data are "1", the OR gate circuit outputs "1" as writing data is present. A predetermined density judgment of the inputted data can be used.

The data "0" or "1" outputted from the OR gate circuit 66 is sent to the dot latch (d1) 74, and shifted to the dot neighborhood determining latch (v1) 72 and (d2) 75 in sequence in synchronization with an image synchronizing clock. On the other hand, the data outputted from the OR gate circuit 66 is sent to the line buffer 67 and delayed one line, then sent to the dot neighborhood determining latch (h1) 70, and sifted to the target dot latch 69 and dot neighborhood determining latch (h2) 71 in sequence and in synchronization with an image synchronizing clock. Moreover, the data outputted from the OR gate circuit 66 is sent to the line buffer 68 and delayed another line and then sent to the dot latch (d3) 76, and sifted to neighboring dot determining latch (v2) 73 and (d4) 77 in sequence in synchronization with an image synchronizing clock.

The judging circuit 78 judges characteristics in the vanity of a target dot according to data in dot neighboring determining latches (d1) 74, (v1) 72, (d2) 75, (h1) 70, (h2) 71,(d3) 76,(v2) 73 and (d4) 77. Then, a result of judging of characteristics is outputted to the gamma correcting circuit 65 by two bit code data.

On the other hand, 4 bit image data is sent to the buffer 62 which can delay inputted data by 4 bits and then, by way of the a adjustment latch 63, inputted to a target dot latch 64 and inputted the gamma correcting circuit 65. In the gamma correcting circuit 65 which includes gamma correcting tables, the gamma table is selected according to the code data from the judging circuit 78, then the inputted 4 bit image data of a target dot is corrected to 8 bit image data according to the selected gamma table, and corrected 8 bit data is outputted to the writing controller 53 (FIG. 1).

FIG. 5 is a diagram of a relationship data of the latches (d1) 74, (v1) 72, (d2) 75, (h1) 70, (h2) 71, (d3) 76, (v2) 73 and (d4) 77 in the characteristics judging unit 61 and selected gamma correcting data in the gamma correcting circuit 65. FIG. 5 shows when data of all dot neighborhood determining latches (d1) 74, (v1) 72, (d2) 75, (h1) 70, (h2) 71, (d3) 76, (v2) 73 and (d4) 77 are "0", a gamma correction data γ is selected, when latch (h1) 10, (h2) 71, (v1) 72, (v2) 73 are "0" and at least one of latches (d1) 74, (d2) 75, (d3) 76 and (d4) 77 are "1" a gamma correction data γ is selected, and when at least one of latches (h1) 70, (h2) 71, (v1) 72, (v2) 73 are "1", a gamma correcting data γ a is selected. Each gamma correcting data, γ a, γ b and γ c, can be calculated previously and stored in memory in the gamma correcting circuit 65.

FIG. 6 shows a sample of gamma correction pattern. There are fifteen gamma correcting patterns because a pattern includes 4 dots, 2 dots×2 dots. Moreover, one dot in the gamma correction pattern has fifteen pattern levels. The data inputted from the gamma correction unit 52 to writing controller are 8 bit data and the maximum writing level is "255". Therefore. writing level 17 is corresponding to pattern level 1, writing level 34 is corresponding to pattern level 2, later increasing 17 writing levels per one pattern level, writing level 255 is corresponding to pattern level 15.

FIG. 7 is a diagram of samples of dot pattern and FIG. 8 is a graph of characteristics of gamma, in other words relationship writing level and density, of each pattern. In FIG. 7, ○ is a target dot written by one of the pattern levels from 1 to 15, and ■ is a dot written by 255 writing levels. In this embodiment, because an image data is processed by multilevel dithering of dot concentrating, when pattern level of the target dot becomes pattern level 15 according to inputted image data, the pattern level in the vicinity of the dot is increased according to increasing level of inputted image data. Therefore, the target dot is a standalone dot or pattern level 15 dot when there are other dots in the vicinity (neighborhood).

In FIG. 7, dot patterns can be classified under the following three group, a group (I) when there are no other neighboring dots, including pattern (a), a group (2) where there is one neighboring dot in a diagonal direction, including pattern (e) and (f) and a group (3) where there is one neighboring dot in a horizontal or vertical direction, including pattern (b), (c,) and (d). The characteristics of above group (1) is described by a line (1), the characteristics of group (2) is described by a line (2) and the characteristics of group (3) is described by a line (3) in FIG. 8. The difference of these characteristics is caused by difference of influence from dots in the vicinity. The line (1) is calculated according to density of fifteen pattern levels formed on the photoconductive belt 1 which is detected by the optical sensor 22. The line (3) is calculated by experiment and the line (2) is calculated according line (1) and (2). These lines ran be obtained by forming patterns on the photoconductive belt and detecting by the optical sensor 22.

Next, an approximate equation for calculating writing levels of a target dot is determined by a least squares method. Then, corrected writing levels which are 8 bit data are calculated by assigning a value of 4 bit pattern levels to a variable in the least squares method. After that, the gamma correction data, γ a, γ b and γ c which provide a relationship between the 4 bit data before correction and 8 bit writing level data after correction, is stored in the memory of the gamma correcting circuit 65. The γ a is made according to the line (3) the γ b is made according to the line (2) and the γ c, is made according to the line (1).

Figure 9:
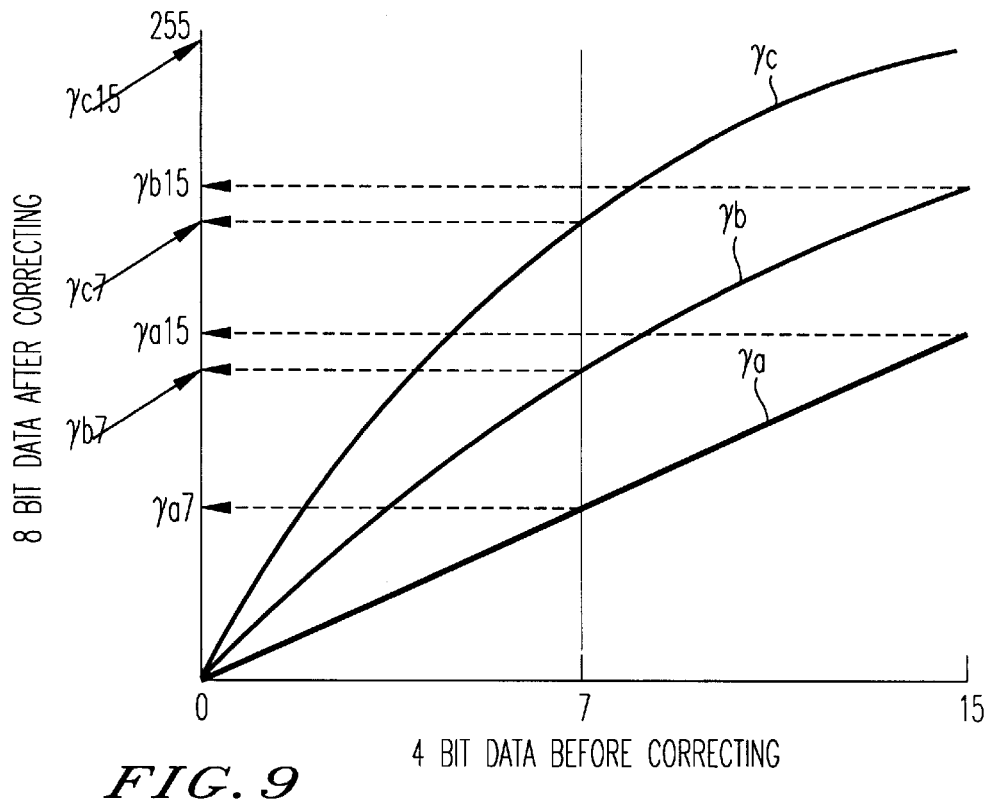
FIG. 9 is a graph of a relation 4 bit data before correcting and 8 bit data after correction.

FIG. 9 is a graph showing the relationship of 4 bit data before correction and 8 bit data after correction. When the γ c is selected as the gamma correction data, for inputted writing level 15, γ c15 is outputted as the writing level by gamma correcting in the gamma correction circuit 65, and for inputted writing level 7, γ c7 is outputted as the writing level by gamma correction. When the γ b is selected as the gamma correction data, for inputted writing level 15, γ b15 is outputted as the writing level by gamma correction, and for inputted writing level 7, γ b7 is outputted as the writing level by gamma correction. When the γ a is selected as the gamma correcting data, for inputted writing level 15, γ a15 is outputted as the writing level by gamma correction, and for inputted writing level 7, γ a7 is outputted as the writing level by gamma correction.

Figure 10:
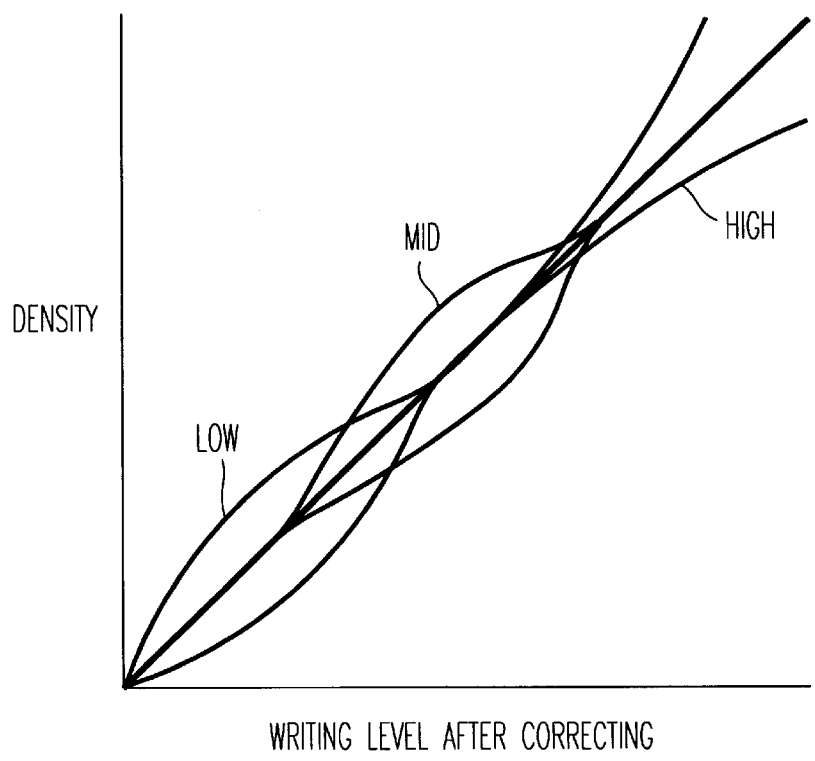
FIG. 10 is a graph of dot gamma characteristics.

FIG. 10 is a graph of dot gamma characteristics. In the gamma correcting circuit 65, when a maximum value of the gamma correcting data γ c is changed, the density of a part of low writing level is changed because in a part of low writing level, there are many dots which has no neighboring dot. When a maximum value of the gamma correcting data γ b is changed, the density of a part of mid writing level is changed because in a part of mid writing level, there are many neighboring dots in a diagonal direction, and when a maximum value of the gamma correcting data γ a is changed, the density of a part of mid writing level is changed because in a part of high writing level, there are many neighboring dots in a horizontal or vertical direction. As halftoning for inputted image data, other process in addition to multilevel dithering can be used. For using other process, the gamma correcting circuit must be changed in accordance with the other process.

As mentioned above, in the image forming apparatus according to the embodiment, a decreasing of a number of levels of halftone of the printed image is prevented because the gamma correcting is not executed before multilevel dithering. The stability of the dots is improved in a part of low writing level. A maximum value of the gamma correcting data can be changed according to the number of neighboring dots, for example, when the number of neighboring dots is small, a writing level of a target dot is changed to high level, therefore an intended dot density or dot size can be obtained regardless of circumstances of neighboring dots.

In the printer controller 51, a multilevel dithering process is executed for an inputted image data and the amount of image data is decreased, and an image data is stored in an image memory. Subsequently in the gamma correcting unit, the image data stored in an image memory is read out and gamma corrected by one dot. Therefore, a low cost apparatus is feasible because, after decreasing the amount of image data, the image data is stored in a small image memory.

Figure 11:
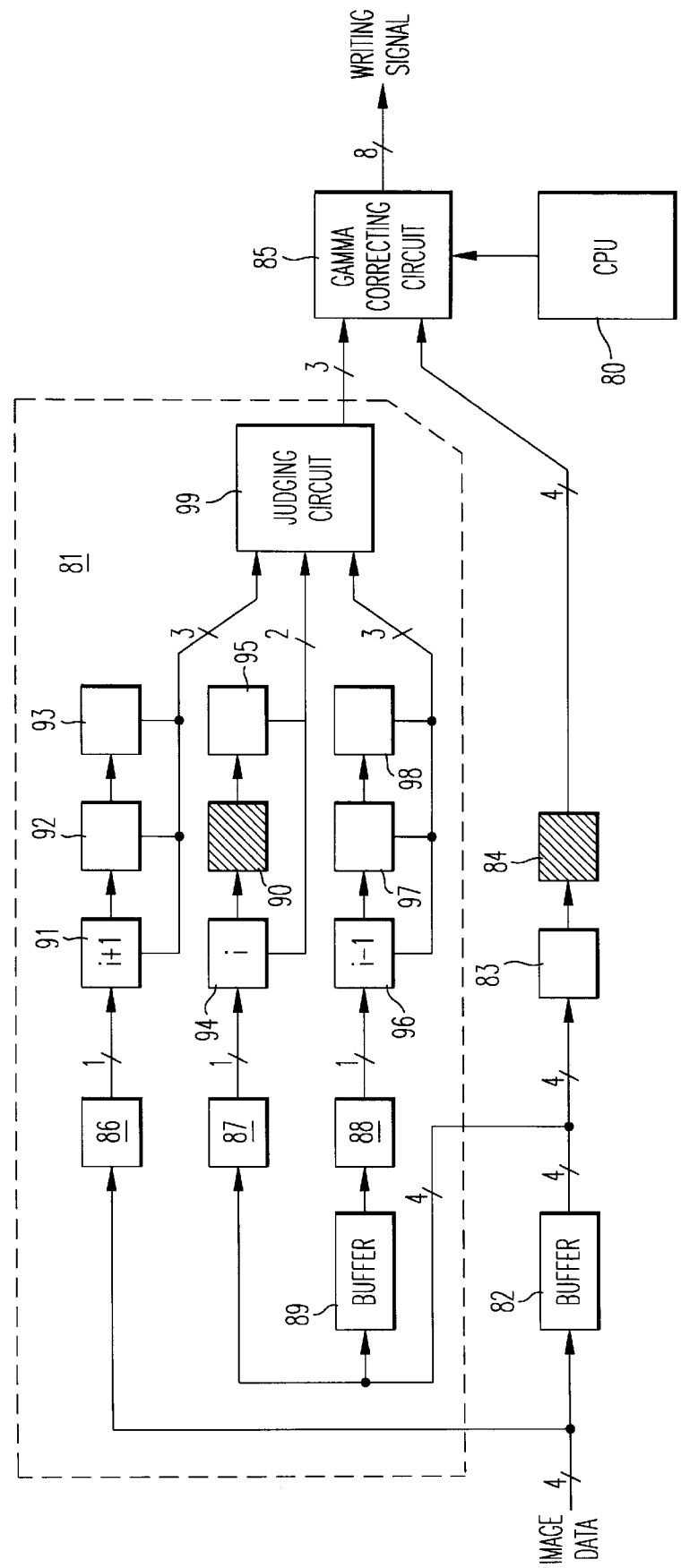
FIG. 11 and FIG. 12 are block diagrams of the gamma correction unit of the image forming apparatus according to a second embodiment.
Figure 12:
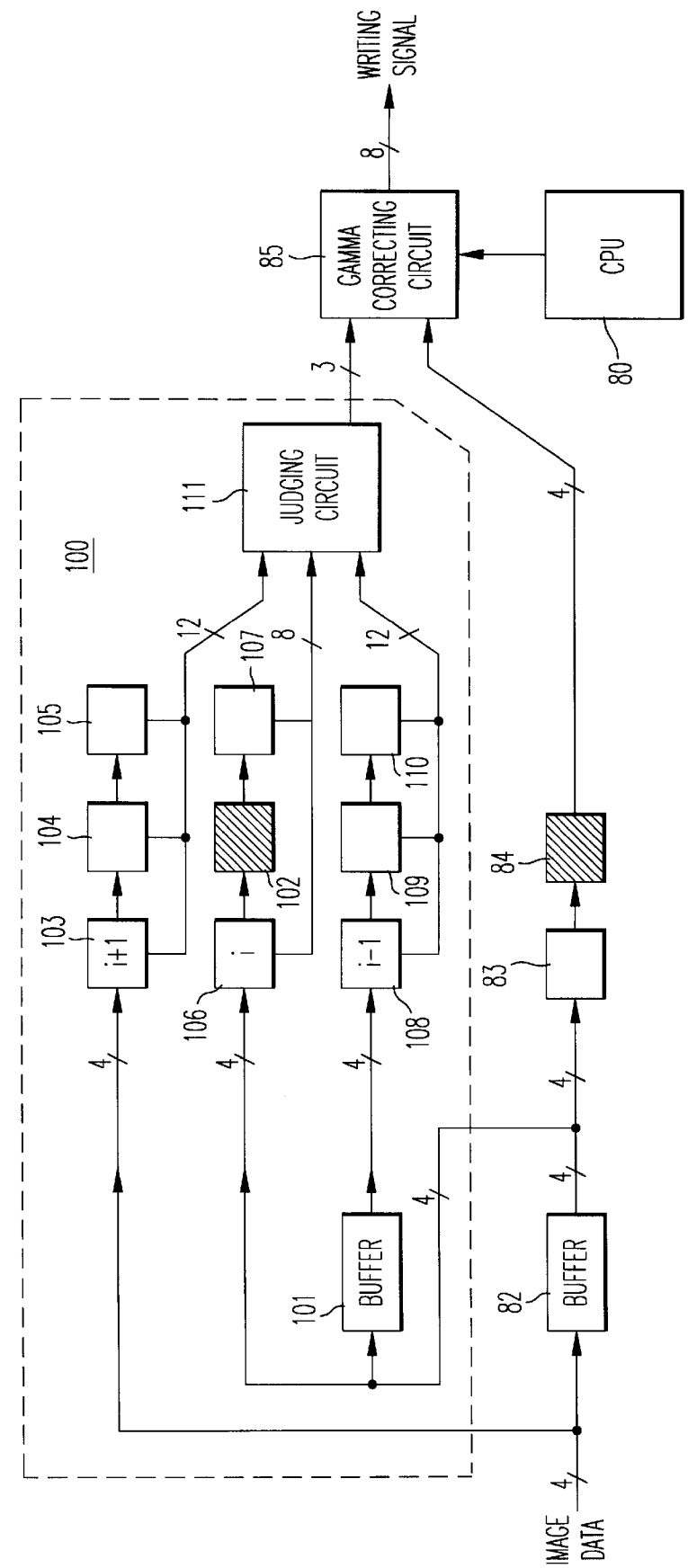

FIG. 11 and FIG. 12 are block diagrams of the gamma correcting unit 52 of the image forming apparatus according to the second embodiment, and FIG. 1, FIG. 2 and FIG. 3 can be applied to this second embodiment. A printer controller in this second embodiment has a selecting function which selects a halftoning for a multilevel dithering, a multilevel error diffusing and etc. FIG. 11 shows a corresponding circuit for an image data by multilevel dithering and FIG. 12 shows a corresponding circuit for an image data by multilevel error diffusing. These circuits are in the gamma correction unit 52 and can be used selectively.

In FIGS. 11 and 12, the gamma correction unit 52 includes characteristics judging units 81 and 100, a line buffer 82, an adjustment latch 83, a target dot latch 84 and a gamma correcting circuit 85. The characteristics judging unit 81 includes an OR gate circuit 86, 87 and 88, a line buffer 89, a target dot latch 90, dot latch 91–98 and judging circuit 99. The characteristics judging unit 100 includes a line buffer 101, a target dot latch 102, dot neighborhood determining latches 103–110 and judging circuit 111.

4 bit image data inputted from the printer controller 52 is sent to the OR gate circuit 66 for every color, yellow, magenta, cyan and black, and the OR gate circuit 86 converts the inputted 4 bit image data to one bit data which indicates a presence or absence of writing data in inputted 4 bit data. In other words, when all of inputted 4 bit data are "0", the OR gate circuit outputs "0", as writing data is absent, when at least one of inputted 4 bit data are "1", the OR gate circuit outputs "1" as writing data is present. The predetermined density of the inputted data can then be used.

The data "0" or "1" outputted from the OR gate circuit 86 is sent to the dot latch (i+1) 91, and shifted to dot latch 92 and 93 in sequence and in synchronization with an image synchronizing clock 4 bit image data inputted from the printer controller 52 is sent to the line buffer 82 and delayed for one line, then the delayed data is inputted to the OR gate circuit 87 and, in the OR gate circuit 87, the inputted data is converted to 1 bit data as in the OR gate circuit 86.

Outputted data from the OR gate circuit 87 is sent to the dot latch (i) 94 and shifted to the target dot latch 90 and the dot latch 95 in sequence and in synchronization with an image synchronizing clock. Moreover, the data outputted from the line buffer 82 is sent to the line buffer 89 and delayed for one line. The delayed data is then inputted to the OR gate circuit 88 and, in the OR gate circuit 88, the inputted data is converted to 1 bit data as in the OR gate circuit 86 and 87. An outputted data from the OR gate circuit 88 is sent to the neighboring dot determining latch (i−1) 96 and shifted to the dot latches 97, 98 in sequence and in synchronization with an image synchronizing clock the dot latch 95.

The judging circuit 99 judges the characteristics which are the number of writing dots in the neighborhood of a target dot according to data in dot neighborhood determining dot latches 91–98. Then, a result of judging of characteristics is outputted to the gamma correcting circuit 85 by three bit code data which represents 0 to 7. The number of writing dot takes on values from 0 to 8 because the number of neighboring dots is eight, so that when the number of writing dots is seven, the judging circuit 99 outputs seven.

On the other hand, 4 bit image data inputted from the printer controller 52 is sent to the dot latch (i+1) 103 in FIG. 2, and shifted to dot neighborhood determining latches 104 and 105 in sequence in synchronization with an image synchronizing clock. 4 bit image data inputted from the printer controller 52 is sent to the line buffer 82, and delayed for one line. The delayed data is then inputted to the latch (i) 106 and the line buffer 101. The data inputted to the latch (i) 101 is shifted to the target dot latch 102 and the dot latch 107 in sequence and in synchronization with an image synchronizing clock. The data inputted to the line buffer 101 is sent to the latch (i+1) 108 and shifted to the latches 109 and 110.

The judging circuit 111 judges the characteristics which are an average value of writing dots surrounding a target dot according to data in dot neighborhood determining latches 103–111. Then, a result of judging of characteristics is outputted to the gamma correction circuit 85 by three bit code data which represents 0 to 7. The average value of writing dots takes values from 0 to 15 because inputted image data is 4 bit which takes values 0 to 15, so the judge circuit 111 outputs higher order 3 bits which takes values 0 to 7.

On the other hand, 4 bit image data is sent to the buffer 82 which can delay inputted data by 4 bits and then, by way of the adjustment latch 83, inputted to a target dot latch 84 and inputted the gamma correction circuit 85. The gamma correction circuit 85 selects a code data among the code data from the characteristics judging unit 81 and the code data from the characteristics judging unit 100 according to a selecting signal from the 1 printer controller 51, and executes correction according to the selected characteristics judgment unit. When the selecting signal from the printer controller 51 represents the data processed by multilevel dithering, the gamma correction circuit 85 selects the characteristics judging unit 81, and when the selecting signal represents the data processed by multilevel error diffusing, the gamma correction circuit 85 selects the characteristics judging unit 100. Then, the gamma correction circuit 85 selects gamma correction data, and corrects the image data of 4 bit target dot and outputs 8 bit writing level signal to the writing controller 53.

Figure 13:
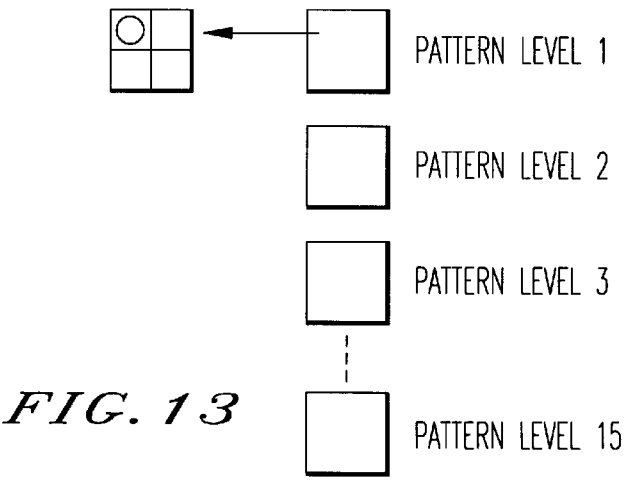
FIGS. 13, 14 and 15 are diagram of samples of gamma correcting pattern.
Figure 14:
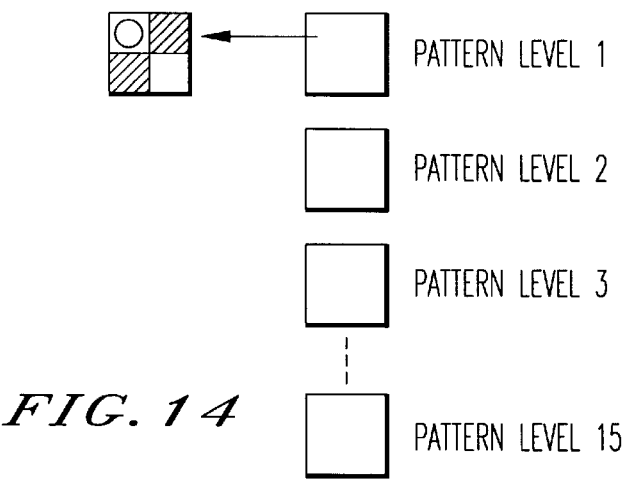
Figure 15:
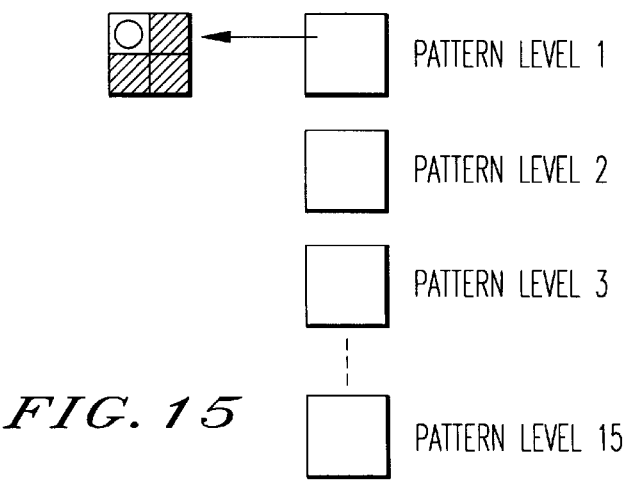

FIGS. 13, 14 and 15 are diagram of samples of gamma correction patterns. In these diagram, a gamma correction dot are indicated as "0", and other writing dots are indicated as shaded areas. There are fifteen gamma correction patterns because a pattern includes 4 dots, 2 dots×2 dots, and one dot in the gamma correction pattern indicated as "0" has fifteen writing levels. The data inputted from the gamma correction unit 52 to the writing controller are 8 bit data and maximum writing level is "255", therefore, writing level 17 corresponds to pattern level 1, writing level 34 corresponds to pattern level 2, later increasing 17 writing levels per one pattern level. Writing level 255 corresponds to pattern level 15.

Figure 16:
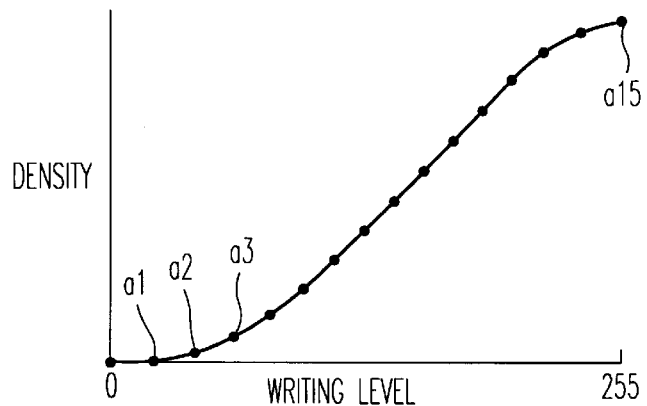
FIGS. 16, 17A, 17B, 18A and 18B are a graph of gamma characteristics which is a writing level-actual density relationship in the care of FIGS. 13, 14 and 15.

FIG. 13 shows the case when no writing dots neighboring a target dot, FIG. 14 shows the case when four neighboring writing dots around target dot and FIG. 15 shows the case when eight neighboring writing dots around target dot. FIGS. 16, 17A, 17B, 18A and 18B are a graph of gamma characteristics which is a writing level-actual density relationship in the case of FIGS. 13, 14 and 15. Fifteen pattern images for gamma correction in FIG. 13 are formed on the photoconductive belt 1 and formed images are read by a optical sensor 22. This process is executed by CPU 80. The graph of FIG. 16 is made according to results of this reading. A density of pattern level 1 is indicated as a1, a density of pattern level 2 is indicated as a2 and a density of pattern level 15 is indicated as a15.

Figure 17A:
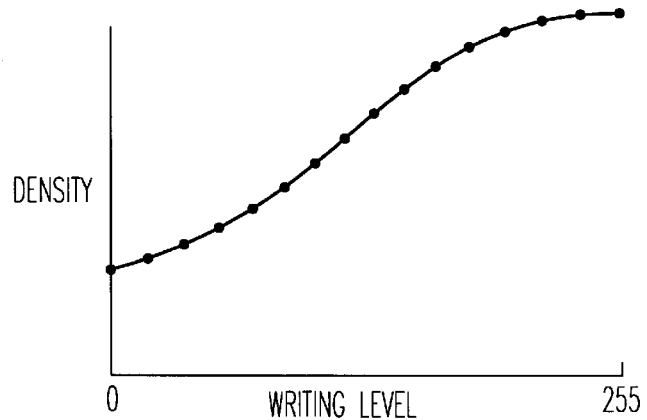
Figure 17B:
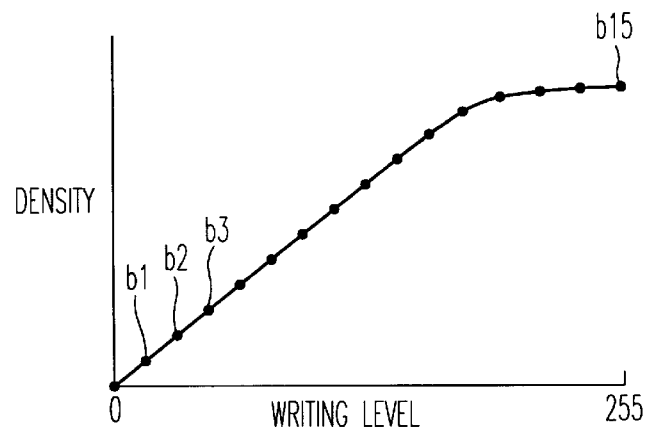

Fifteen pattern images for gamma correction in FIG. 14 are formed on the photoconductive belt 1 and formed images are read by a optical sensor 22. This process is executed by CPU 80. The graph of FIG. 17A is made according to results of this reading. In FIG. 17A, when writing level is "0", a density is not "0" because of the influence of the neighboring dots. FIG. 17B is normalized graph for setting a density to "0" when the writing level is "0". In FIG. 17B, a density of pattern level 1 is indicated as b1, a density of pattern level 2 is indicated as b2 and a density of pattern level 15 is indicated as b15.

Figure 18A:
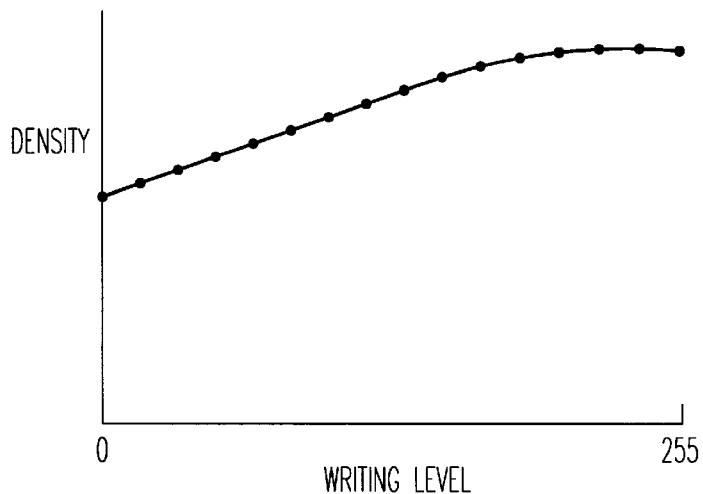
Figure 18B:
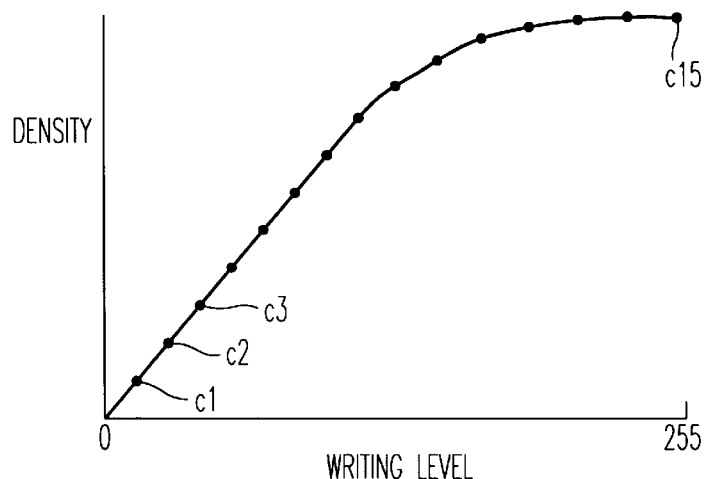

Fifteen pattern images for gamma correction in FIG. 15 are formed on the photoconductive belt 1 and formed images are read by a optical sensor 22. This process is executed by CPU 80. The graph of FIG. 18A is made according to results of this reading. In FIG. 18A, when writing level is "0", a density is not "0" because of influence of the neighboring dots. FIG. 18B is normalized graph for setting a density is "0", when writing level is "0". In FIG. 18B, a density of pattern level 1 is indicated as c1, a density of pattern level 2 is indicated as c2 and a density of pattern level 15 is indicated as c15.

Figure 19:
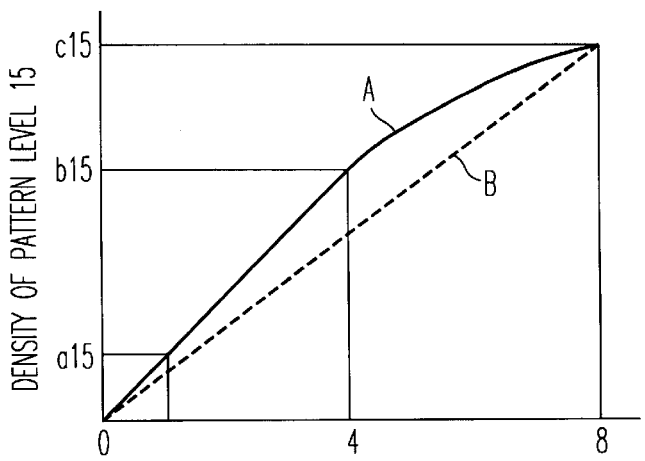
FIG. 19 is a graph of a number of neighboring dots—a density of pattern level 15.

FIG. 19 is a graph of a number of neighboring dots versus a density of pattern level 15. Line A is calculated by spline converting or a least squares method according to the density of a15, b15 and c15. Line B is a line showing a relationship between the density of pattern level 15 when the number of neighboring dots is "0" and the density of pattern level 15 when the number of neighboring dots is 15.

Gamma characteristics for other numbers of neighboring dots are calculated according to gamma characteristics of FIG. 16–FIG. 18B by spline converting or a least squares method. For example, when number of neighboring dots is 1 to 3, gamma characteristics are calculated by the interpolation equation;

$$(a x \times (4-s) + b x \times s)/4 \ (x=1\sim15)$$

and when number of neighboring dots is 5 to 7, gamma characteristics are calculated by the interpolation equation;

$(b \times (4-S) + o \times x \times S)/4$ ($x=1\sim 1\ 5$, $S=s-4$)

A gamma characteristics set by an operator can be executed. FIG. 20 is graph of a writing level-density. A operator can set density P1, P2 and P3 by for example display and mouse connected a computer. P1, P2 and P3 are typical points, and locations between points are interpolated by spline correction. These setting are sent to the image forming apparatus and gamma correcting data is made according to the sent data. For example, the position data of P0, P1x, P2x and P3 are sent to the image forming apparatus. The position data is for example percentage of displacements from P1 which is on the straight line. In the image forming apparatus, the writing level is calculated according to inputted percentage of displacements and gamma characteristics. FIG. 21 shows inputted data. The process of calculating gamma correction data and storing data is the same as in the first embodiment.

Figure 22:
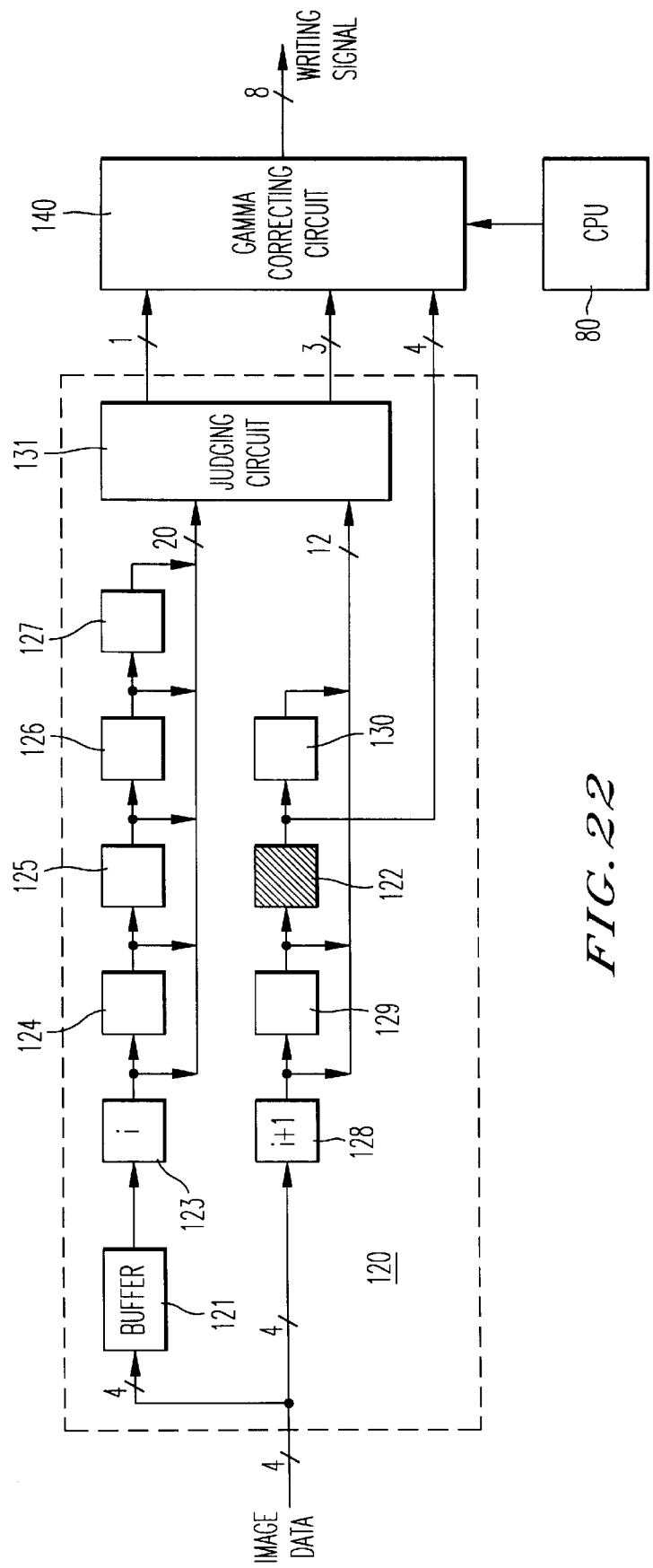
FIG. 22 is block diagrams of the gamma correcting unit of the image forming apparatus according to the third embodiment.

FIG. 22 is a block diagram of the gamma correction unit 52 of the image forming apparatus according to a third embodiment FIG. 1, FIG. 2 and FIG. 3 can be applied to the third embodiment. A printer controller in this third embodiment has a selecting function which selects a halftoning among a multilevel dithering of dot concentration and a multilevel dithering of dot decentralization.

In FIG. 22, the gamma correction unit includes a characteristics judging unit 120 and gamma correction circuit 140. The characteristics judging unit 81 includes a line buffer 121, a target dot latch 122, dot neighborhood determining latches 123–130 and judging circuit 131. 4 bit image data inputted from the printer controller 52 is sent to the line buffer 121 and the neighboring dot determining latch (i+1) 128. The data inputted to the dot latch (i+1) 128 is shifted to the dot latch 129, the target dot latch 122 and the dot latch 130 in sequence and in synchronization with an image synchronizing clock.

On the other hand, the data inputted to the line buffer is delayed one line, then sent to the dot neighborhood determining latch (i) 123 and shifted to the dot neighboring determining latches 124, 125, 126 and 127 in sequence and in synchronization with an image synchronizing clock.

The judging circuit 131 judges characteristics which form an AND function of neighboring dots and the number of writing dots around a target dot according to data in dot neighborhood determining latches 123–130. Then, a result of judging of characteristics is outputted to the gamma correction circuit 140, the AND function of neighboring dots is outputted by one bit code data, the number of writing dots around a target dot is outputted by three bit code data. When the AND function of neighboring dots is "0", the judging circuit 131 outputs "0", when the AND function of neighboring dots is not "0", the judging circuit 131 outputs "1".

The gamma correction circuit 140 discriminates a kind of halftoning according to one bit code data which is the AND function of neighboring dots from the judging circuit 131. When this one bit code data is "0", the gamma correcting circuit 140 discriminates multilevel dithering of dot concentrating, and when this one bit code data is "1", the gamma correction circuit 140 discriminates multilevel dithering of dot decentralization. Then, gamma correcting data is selected according to this discriminating and three bit code data which is a number of writing dots around a target dot determined from the judging circuit 131, and 4 bit image data of target dot from the target dot latch 122 is corrected according to the selected gamma correction data, then 8 bit writing level data is outputted to the writing controller 53.

This gamma correcting according to the gamma correcting data is the same as the first or the second embodiment.

In the above-mentioned embodiments, neighboring dots are not only indicated dots around the target dot, but are also other dots. For example, in the third embodiment, when neighboring dots, as shown in the shaded area in FIG. 23, are used, a good image can be output. This invention may be conveniently implemented using a conventional general purpose digital computer or microprocessor programmed according to the teachings of the present specification, as will be apparent to those skilled in the computer art. Appropriate software coding can readily be prepared by skilled programmers based on the teachings of the present disclosure, as will be apparent to those skilled in the software art. The invention may also be implemented by the preparation of application specific integrated circuit or by interconnecting an appropriate network of conventional components, as will be readily apparent to those skilled in the art.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An image forming apparatus which forms an image by dot images comprising:
   halftoning means for processing of halftone for inputted image data;
   judging means for judging characteristics in the neighborhood of a target dot output from said halftoning means;
   gamma correcting means for correcting gamma characteristic of image data of the target dot according to judging by said judging means wherein said gamma correcting means includes storing means for storing at least two gamma correcting data, selecting means for selecting gamma correcting data among gamma correcting data stored in said storing means according to judging by said judging means and output means for outputting a writing level signal which is set according to the gamma correcting data selected by said selecting means, said apparatus further comprising pattern forming means for forming a dot pattern for gamma correction, a pattern reading means for reading density of said dot pattern formed by said pattern forming means and generating means for generating gamma correcting data according to said density of dot pattern read by said pattern reading means.

2. An image forming apparatus according to claim 1, wherein said storing means stores gamma correcting data according to each characteristics in the neighborhood of the target dot.

3. An image forming apparatus according to claim 1, wherein said generating means calculates dot gamma characteristics according to said density of dot pattern read by said pattern reading means and generates gamma correction data according to said calculated dot gamma characteristic.

4. An image forming apparatus according to claim 3, wherein said pattern forming means forms pattern using the writing levels of equal step from a minimum level to a maximum level.

5. An image forming apparatus according to claim 1, wherein said generating means calculates gamma correction data with a writing level between highest level and lowest level according to the gamma correcting data which writing level is highest and the gamma correction data which writing level is lowest.

6. An image forming apparatus according to claim 1, wherein said pattern forming means forms the pattern both when there are no dots in the neighborhood of said target dot and when there are dots around said target dot, and said generating means generates gamma correction data according to formed pattern density read by said pattern reading means and generates gamma correction data of dot pattern not formed according to said gamma correction data but instead generated according to formed pattern density.

7. An image forming apparatus according to claim 1, wherein said judging means comprising binary data generating means for generating binary data according to neighboring dot determining data.

8. An image forming apparatus according to claim 1, wherein said judging means judges according to at least predetermined dots is front of the target dot, predetermined dots to the left of the target dot, predetermined dots to the right of the target dot and predetermined dots in back of the target dot.

9. An image forming apparatus according to claim 1, wherein said judging means judges according to three dots in front of the target dot and dots to the left of target dot.

10. An image forming apparatus according to claim 1, wherein said judging means judges according to a number of writing neighboring dots.

11. An image forming apparatus according to claim 1, wherein said judging means judges according to the average number of levels of neighboring dots.

12. An image forming apparatus according to claim 1, wherein a number of writing levels of a target dot is larger than a number of levels of data outputted said halftoning means.

13. An image forming apparatus according to claim 1, further comprising dot gamma characteristics setting means for setting dot gamma characteristics and said gamma correction means corrects writing levels according to dot gamma characteristics set by said dot gamma characteristics setting means.

14. An image forming apparatus which forms an image by dot images comprising:
   halftoning means for processing of halftone for inputted image data;
   judging means for judging characteristics in the neighborhood of a target dot output from said halftoning means;
   gamma correcting means for correcting gamma characteristics of image data of the target dot according to judging by said judging means, wherein said gamma correcting means sets a writing level of a target dot as a higher writing level of the target dot, when the number of dots around a target dot decreases.

15. An image forming apparatus which forms an image by dot images comprising:
   halftoning means for processing of halftone for inputted image data;
   judging means for judging characteristics in the neighborhood of a target dot output from said halftoning means;
   gamma correcting means for correcting gamma characteristics of image data of the target dot according to judging by said judging means, wherein said gamma correcting means sets a maximum writing level of a target dot according to judging by said judging means.

16. An image forming apparatus which forms an image by dot images comprising:
   halftoning means for processing of half tone for inputted image data;
   judging means for judging characteristics in the neighborhood of a target dot output from said halftoning means;
   gamma correcting means for correcting gamma characteristics of image data of the target dot according to judging by said judging means, wherein said judging means comprises first judging means for judging according to number of writing neighborhood dots, second judging means for judging according to average number of neighboring dots, and judge selecting means for selecting judging means from said first judging means or second judging means according to kind of process of halftone processed by said halftoning means.

17. An image forming apparatus which forms an image by dot images comprising:
   halftoning means for processing of half tone for inputted image data;
   judging means for judging characteristics in the neighborhood of a target dot output from said halftoning means;
   gamma correcting means for correcting gamma characteristics of image data of the target dot according to judging by said judging means, said image forming apparatus further comprising:
   image storing means for storing image data processed at halftone by said halftoning means;
   reading means for reading out image data from said image storing means; and
   said judging means judges according to the data read out from said storing means by said reading means.

18. An image forming apparatus which forms an image by dot images comprising:
   image processor for processing of halftone for inputted image data;
   judging circuit for judging characteristics in the vicinity of a target dot output by said image processor;
   gamma correction circuit for correcting gamma characteristic of image data of the target dot according to judging by said judging circuit wherein said gamma correction circuit comprises:
   memory for storing at least two gamma correction data;
   selector for selecting gamma correction data from among gamma correcting data stored in said memory according to judging by said judging circuit;
   output circuit for outputting writing level signal which is set according to the gamma correcting data selected by said selector.

* * * * *